2,915,430

METHOD OF CONTROLLING NEMATODES WITH N-ACYLPYRROLIDONES

David Taber, Easton, Pa., assignor to General Aniline & Film Corporation, New York, N.Y., a corporation of Delaware No Drawing. Application September 30, 1958
Serial No. 764,241

6 Claims. (Cl. 167—33)

The present invention relates to an improved method of protecting chlorophyllaceous plant materials subject to attack by soil nematodes.

It is known that in the fumigation of soils for the control or destruction of nematodes, various chemical compounds have been suggested. Many of them are heavy liquids requiring dilution with inert organic solvents and some of them are lachrymators. For example, ethylene dibromide has been employed as a soil fumigant. It is a heavy liquid with a rather low rate of evaporation, and moves slowly through the soil. Liquid mixtures of dichloropropane and dichloropropylene, which are much lighter than ethylene dibromide, have also been employed as soil fumigants, but the mixture is not nearly so toxic to soil organisms and insects.

The main disadvantage of the methods employed in soil fumigation with the foregoing organic compounds is the cost of the equipment needed to treat large seed beds and the amount of time and labor involved in moving the equipment such as, injectors, broadcasters, etc., from place to place. With most fumigants, a water seal must be applied immediately for best results. The treated area must be covered with burlap sacks, canvas and the like, which in turn must be sprinkled with water and then removed after 4 or 5 days. The soil is then allowed to aerate, and no seeds are planted until every trace of the fumigant has disappeared, which usually takes from 8–12 days. In wet, cool weather, it may take longer.

Chloropicrin forms a gas that is extremely toxic to plants in both the soil and the air. Under certain weather conditions a blanket of gas may collect over a fumigated bed near the ground, then drift slowly over a nearby area, and cause severe injury to the plants growing there, especially at night when foliage is wet with dew. In addition, it is a potent lachrymator.

D-D, which is a mixture of 1,3-dichloropropylene and 1,2-dichloropropane, obtained as a by-product in the manufacture of allyl alcohol from petroleum, is inflammable and is dangerous to use in an enclosed space in the presence of sparks or open flames.

It is an object of the present invention to provide an improved method of protecting chlorophyllaceous plant materials subject to attack by nematodes by treating the soil with N-acylpyrrolidones which are relatively nontoxic to plants and to warm blooded animals.

Other objects and advantages will become more clearly manifest from the following description.

I have discovered that N-acylpyrrolidones having the following general formula:

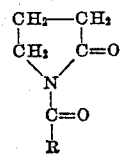

wherein R represents an alkyl group of 1 to 17 carbon atoms or a phenyl or furyl group, are very effective nematocides. The N-acylpyrrolidones are immediately dispersible in the soil and as a consequence are more readily effective within a short period of time. The compounds wherein R is an alkyl group of 1 to 3 carbon atoms are completely miscible with water and much more readily dispersed in soil solution and do not require diffusion prior to planting. Those compounds wherein R contains 4 or more carbon atoms are soluble in the usually selected isoparaffinic hydrocarbons, straight chain liquid hydrocarbons, naphthols, deodorized kerosene, alcohols such as ethanol, isopropanol and the like. We prefer to use those types of solvent which have little or no deleterious effect on the plant infested with nematodes. In such solution, they are also readily dispersed in soil and do not require diffusion prior to planting. In addition, the N-acylpyrrolidones are neither primary irritants nor skin sensitizers and as a result the mammalian toxicity is extremely low.

The lower members of N-acylpyrrolidone series are colorless liquids and can be readily applied without the need of special handling equipment or precautions. In view of their solubility in water and the aforementioned organic solvents, they are readily diluted for immediate use either in the field or greenhouse. All of the N-acylpyrrolidones disclosed herein are effective as nematocides in a concentration of from 0.1 to 20%. Effective nematode control and eradication is achieved by employing a solution in the aforementioned concentration of any one of the N-acylpyrrolidones characterized by the foregoing general formula. The precise amount of the N-acylpyrrolidone to be employed in the control and eradication of soil nematodes is not critical and the effective amount to be employed, depending upon whether the application is to be made in the field, greenhouse, flats or pots, is readily determined by routine trial experiments. For open fields, from 20 to 50 lbs. per acre may be used either in concentrated or dilute form.

The N-acylpyrrolidones characterized by the foregoing general formula are readily prepared by conventional means by treating 1 mole of 2-pyrrolidone with 1 mole of a monocarboxylic acid chloride or acid anhydride.

As illustrative examples of the N-acylpyrrolidones characterized by the foregoing general formula and prepared by conventional means, the following may be mentioned:

(1) N-acetyl pyrrolidone
(2) N-propionyl pyrrolidone
(3) N-butyryl pyrrolidone
(4) N-valeryl pyrrolidone
(5) N-caproyl pyrrolidone
(6) N-heptanoyl pyrrolidone
(7) N-caprylyl pyrrolidone
(8) N-pelargonyl pyrrolidone
(9) N-capryl pyrrolidone
(10) N-lauroyl pyrrolidone
(11) N-myristoyl pyrrolidone
(12) N-palmitoyl pyrrolidone
(13) N-stearoyl pyrrolidone
(14) N-benzoyl pyrrolidone
(15) N-furoyl pyrrolidone Instead of employing the foregoing N-acylpyrrolidones in aqueous solution or in solution with alcohol or the aforementioned aliphatic hydrocarbons, they may be mixed with a solid carrier such as talc, diatomaceous earth, Fuller's earth, bentonite, chalk, mica, clay and the like, normally employed as carriers for solid and liquid agricultural pest control. In lieu of the liquid hydrocarbon solvents, the N-acylpyrrolidones may be used in aqueous emulsions which are prepared in the customary manner and such materials applied to the soil in order to drench it, particularly soils in greenhouse benches and the like. Another unusual feature of the N-acyl-pyrrolidones is that they may be injected directly into the soil. This is readily accomplished by directing the N-acylpyrrolidone into holes or other openings in the soil in an amount ranging from 5 to 10 cc. for each hole spaced one foot apart. Still another unusual feature of the N-acylpyrrolidones is that they are all high boiling liquids or solids, and as a result have low vapor pressures, thus permitting soil fumigation to proceed for longer periods of time and at the same time providing for the retention of the toxic concentration for extended periods.

The following examples will illustrate the manner in which the N-acylpyrrolidones may be employed as soil fumigants.

Example I 100 gram samples of dry sand were mixed with 5 gram samples of a brei of tomato roots invested with root-knot nematocides (*Meloidogyne incognita*). This mixture was transferred to clay pots and 50 mg. of the test chemical was added to the mixture. The pot was then wrapped in Saran and allowed to stand for 24 hours. The mixture was transferred to stainless steel cylindrical screens (100 mesh). The screen was placed in the bottom half of a 9 cm. Petri dish containing 25 ml. of water and covered with the Petri dish cover. An additional 10 ml. of distilled water was added to each plate in order that free water would be available in the dish. After 24 hours microscopic counts were made of the living nematodes which migrated through the screen and into the Petri dish. Nematode counts were made by microscope. At least 10 fields were read or 150 nematodes counted per dish.

| Nematocidal Agent of Illustration | Total Living Nematodes in 10 Fields |
| --- | --- |
| (1) | Fewer than 10 nematodes. |
| (2) | Do. |
| (3) | Do. |
| (4) | Do. |
| (5) | Do. |
| (6) | Do. |
| (7) | Do. |
| (8) | Do. |
| (9) | Do. |
| (10) | Do. |
| (11) | Do. |
| (12) | Do. |
| (13) | Do. |
| (14) | Do. |
| (15) | Do. |
| Blank (Control) | 82. |

In order to determine whether 2-pyrrolidone per se or a lower alkylated derivative thereof, i.e. N-ethylpyrrolidone, would have any nematocidal activity, these two compounds were subjected to the same procedure as in Example I and the following results obtained:

| Nematocidal Agent | Total Living Nematodes in 10 Fields |
| --- | --- |
| 2-pyrrolidone | 42 |
| N-ethylpyrrolidone | 50 |

The foregoing results clearly establish that the presence of an acyl group in the N portion of the 2-pyrrolidone yields a surprisingly new and unexpected effect.

Example II

The compounds of Illustrations 1 to 15 inclusive, were dissolved in a commercially available petroleum hydrocarbon available on the market under the brand name of "Solstrols" to give solutions containing 0.1 gram, 0.4 gram, 1.5 grams and 2 grams per liter and the solutions applied to sandy loam soil which was heavily infected with root-knot nematodes of the *Meloidogyne incognita* species. The rate of application corresponded to 100, 400, 1500 and 2000 parts of the nematocidal agent per million parts by weight of soil.

Approximately after 30–60 days following the treatment of the soil, the soil was seeded with tomatoes. As a control, untreated plots were also planted with tomato seeds. Six weeks later the plants were lifted from the soil and the roots examined for gall formation. In the controlled plots, the plants were stunted and the root systems covered with numerous galls. The roots of the plants grown in the soil treated with the N-acylpyrrolidones were absolutely free from galls and the plants were very healthy with the usual normal healthy root systems.

The unique property of the N-acylpyrrolidones as soil fumigants is their lack of toxicity when applied to the soil in which some plants may be grown. In view thereof, the N-acylpyrrolidones may be employed very effectively for pre-plant soil treatment. In addition, they give long lasting control of cyst-forming nematodes, root-forming nematodes and nematodes that enter root tissues.

I claim:

1. The process of eradicating and controlling soil nematodes which comprises applying into the soil in the vicinity of said nematodes a nematocidal amount of an N-acylpyrrolidone having the following general formula:

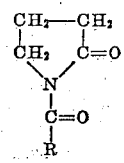

wherein R represents a member selected from the class consisting of alkyl groups of 1 to 17 carbon atoms, phenyl and furyl groups.

2. The process according to claim 1 wherein the N-acylpyrrolidone is N-acetyl pyrrolidone.

3. The process according to claim 1 wherein the N-acylpyrrolidone is N-butyryl pyrrolidone.

4. The process according to claim 1 wherein the N-acylpyrrolidone is N-caproyl pyrrolidone.

5. The process according to claim 1 wherein the N-acylpyrrolidone is N-stearoyl pyrrolidone.

6. The process according to claim 1 wherein the N-acylpyrrolidone is N-benzoyl pyrrolidone.

References Cited in the file of this patent

UNITED STATES PATENTS 2,853,416    Kellog _____ Sept. 23, 1958

OTHER REFERENCES

Chem. Abst., vol. 50 (1956), p. 16786d.